F. R. MORRIS, DEC'D.
C. E. & M. R. MORRIS, EXECUTORS.
METHOD OF AND APPARATUS FOR DRYING AND COOLING GRAIN.
APPLICATION FILED OCT. 19, 1916.

1,288,438.

Patented Dec. 17, 1918.
5 SHEETS—SHEET 1.

Fig. 1.

WITNESSES

INVENTOR.
Fulton R. Morris,
BY
ATTORNEY

F. R. MORRIS, DEC'D.
C. E. & M. R. MORRIS, EXECUTORS.
METHOD OF AND APPARATUS FOR DRYING AND COOLING GRAIN.
APPLICATION FILED OCT. 19, 1916.

1,288,438.

Patented Dec. 17, 1918.

WITNESSES

INVENTOR
Fulton R. Morris,
BY
ATTORNEY

UNITED STATES PATENT OFFICE.

FULTON R. MORRIS, OF MILWAUKEE, WISCONSIN; CASSIUS E. MORRIS AND MARK R. MORRIS EXECUTORS OF THE WILL OF SAID FULTON R. MORRIS, DECEASED; SAID CASSIUS E. MORRIS ASSIGNOR OF THE ENTIRE RIGHT TO ALBERT W. STRONG, OF MINNEAPOLIS, MINNESOTA.

METHOD OF AND APPARATUS FOR DRYING AND COOLING GRAIN.

1,288,438.   Specification of Letters Patent.   Patented Dec. 17, 1918.

Application filed October 19, 1916. Serial No. 126,582.

*To all whom it may concern:*

Be it known that I, FULTON R. MORRIS, a citizen of the United States, residing at Milwaukee, in the county of Milwaukee and State of Wisconsin, have invented certain new and useful Improvements in Methods of and Apparatus for Drying and Cooling Grain, of which the following is a specification.

This invention relates to an improvement in the method of and apparatuses for drying and cooling grain, and particularly to a method and apparatus adapted for expeditiously drying the grain to remove excess moisture therefrom without disturbing the constituents of or changing the properties in the grain and which then presents the grain to be cooled so that as it is stored, the danger of sweating or overheating will be eliminated.

An object of my invention is to provide a method by which a continuous supply of grain can be operated upon and with which any percentage of excess moisture can be removed in a single treating, and which method can be carried out with a comparatively simple and inexpensive portable apparatus not requiring a steam boiler or other permanently installed apparatus.

A further object is to provide a self-contained and portable drier which is complete and is a unitary structure adapted for treating the grain from start to finish, and which has all of the parts thereof mounted on a suitable truck or other wheel supported structure in such a manner that the drier is readily portable.

Another object lies in so constructing the drier that it embraces a heater, fan and engine, elevator to take the grain as supplied and fill the same into the drier bin, a conveyer underneath the cooling bin to take care of the dried and cooled grain as it passes down from the drier and flows through the cooler, and which conveyer is so arranged that the grain may be discharged at a point and in a continuous stream or flow which gives facility in the handling of the dried and cooled grain.

A still further object lies in so arranging the air pipes from the fan to the drier air chamber and to the cooler chamber, that the air is taken in by the fan and then in part passes through the heater pipes or through suitable heating means and thence to the drier air chamber, and a part of the air is conducted to the lower section of the air chamber which constitutes the cooler chamber, the grain being thus cooled to atmospheric temperature as it passes slowly down from the drier chamber to the conveyer to be sacked, taken back to storage or otherwise handled.

Yet another object is to provide a structure which is a complete portable drier, but at the same time is made sufficiently compact that it is constructed as a unit and may be loaded on a flat car and transported to any point required, thence removed from the car and put in position in comparatively short time and by persons not particularly skilled in mechanics, thus being particularly adaptable for small country elevators and for use in other localities where the quantity of grain would not justify the installation of an expensive boiler plant or the construction of a complete permanently installed drier and cooler.

With the above and other objects in view, my invention consists in certain novel features of construction and combination of parts which will be hereinafter set forth in connection with the drawings and then more particularly pointed out in the claims.

The main supporting frame-work 1 is preferably built up of channel beams or other suitable metal frame members and has a supporting platform carried thereby. Forward and rear axles 2 and 3 are mounted beneath the frame-work 1 and the wheels 4 and 5 are mounted on these axles to support the frame-work. If desired, the axle 2 may be mounted to be capable of swinging and turning movement in a lateral path to permit steering of the course of travel of the vehicle thus constructed as the same is either drawn or otherwise moved forward. As the structure is preferably made of such size and sufficiently light that it may be moved from one place to another by use of draft animals, it is perhaps preferable that a tongue or other hitching means be connected with the forward axle 2 or with the forward part of the frame, however, as this structure does not form a part of my invention and might be of various forms, I have not herein shown any specific or particular adaptation.

At the rear end of the frame structure 1, the grain treating chambers 6 and 7 are disposed, the chamber 7 being above the chamber 6 and these parts constituting the cooling and the drying chambers, respectively. A fan casing 8 is mounted on the forward end of the frame structure 1, preferably adjacent to one side of the frame structure and a gasolene engine 9 is mounted on the opposite side of the frame at the forward end. While I have set forth the power member or unit 9 as being a gasolene engine, it will be understood that a kerosene, an electric motor, or other suitable power means may be employed, although the gasolene motor is best adaptable in this connection as being more simple in operation and capable of being operated without the use of an electric current supply, and it is preferable that the parts be so arranged that the fan shaft 10 and the shaft of the motor 9 are in alinement and can thus be connected in such a relation that the fan shaft will be positively driven. A furnace 11 is mounted between the parts as carried on the forward and rear ends of the frame-work 1, and an air pipe 12 leads from the fan casing 8 to the heating chamber 13 of the furnace.

The drier and cooler chambers 7 and 6 are constructed in a manner similar to the chambers as disclosed in Patent 1,157,172, which was granted upon an application made by me, and the side walls 14 and 15 have the pervious ducts 16 connected therebetween, these ducts being arranged in substantially the same manner as shown and described in the patented structure. As is illustrated, the present apparatus differs somewhat in the formation of the drier and cooler chambers from the structure shown in the patent, in that the drier and cooler chambers are provided on one side only of the air distributing chambers 17 and 18, although it will of course be understood that the pervious air ducts communicate with these air distributing chambers and with the atmosphere at substantially the same arrangement. A cooling air pipe 19 is connected with the fan casing 8 and is extended to have connection with the air distributing chamber of the cooler chamber 6, and a cut-off damper 20 is mounted in this pipe to control the supply of cooling air to the distributing chamber 18 and thus consequently into and through the grain cooling chamber 6. A drying air tube 21 is connected between the hot air chamber 13 of the furnace 11 and the air distributing chamber 17, and thus as air is blown from the fan casing 8 through the connecting tube 12 to the heating chamber 13 and then through the drying tube 21 into the distributing chamber 17 and through the open end of the alternate pervious air ducts 16 to flow through the chamber 7 and then be discharged from the chamber to those pervious air ducts which are open to the atmosphere through the side wall 17. The connection of the cooling air tube 19 with the distributing chamber 18 provides a passage from the fan casing 8 through which the air at atmospheric temperature as taken through the eye 22 of the fan casing 8 is supplied to flow through the air ducts 16 which are open through the wall 14 of the cooling chamber 6 and then after passing through the grain, to be again discharged to the atmosphere through those pervious air ducts which open through the wall 15. Under some circumstances, it may be found desirable to supply cold air to the distributing chamber 17 and for this purpose, I provide the damper 23 which is placed between the chambers 17 and 18.

An elevator casing 24 is mounted at one side of the supporting frame of the machine and has elevator mechanism therein, preferably of the chain type, which will carry the grain to be discharged through the tube 25 into the drier chamber 7. As the drier structure as an entirety is intended to be transported from place to place by being carried on a flat car or drawn or moved over the road, it is essential that the height be kept down to the minimum and where the elevator tube 24 is made sufficiently high that the proper and most sufficient supply of the grain to the drier chamber 7 will be accomplished, it is thought to extend considerably above the main structure of the drier, and therefore it is preferable that the casing be made in two sections, the upper of which is hinged to the lower substantially at points 26 and as it is desired to lower the upper section of the casing, this hinge joint will be opened and the upper portion or section will be laid over to be supported by the bracket 27. With this same purpose in view, it is perhaps preferable that the smoke stack 28 of the furnace be made to be hinged or removable so that the height of the same can be reduced.

As has been stated, the fan shaft 10 is preferably connected to be directly operated by operation of the engine 9 and the fan 29 is made of such design that as the shaft 10 is revolved, air will be taken in through the eye 22 of the fan casing 8 and will be forced through the tubes 19 and 21, it of course being understood that the air passing through the tube 21 is pre-heated and that communication between the two air distributing chambers 17 and 18 is normally cut off although air from the chamber 18 can be supplied to the chamber 17 to temper the air therein coming from the heating chamber 13 of the furnace, by operating the damper 23. The furnace 11 may be of any desired construction, although it is perhaps preferable that it be of the tube type as the air passing through the heating chamber 13 must be rapidly raised in its temperature and it is even desirable at times to attain a temperature of up to 250° Fahrenheit.

Figure 1:
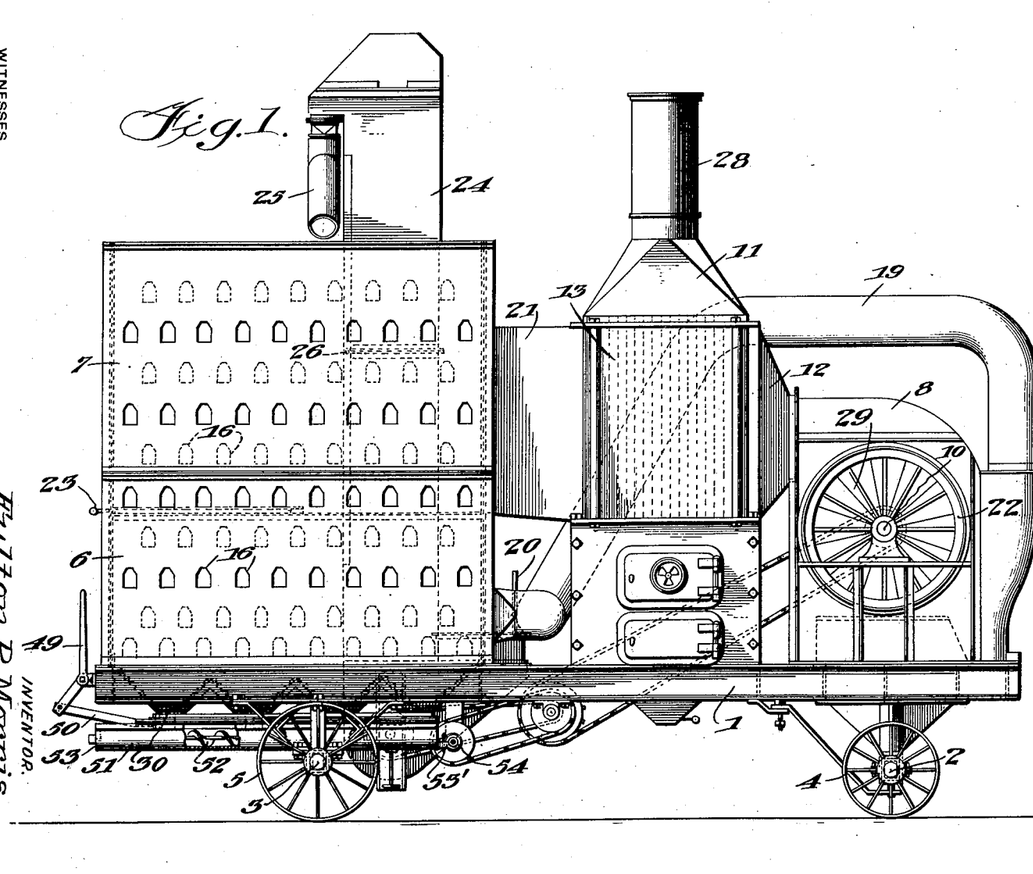
Figure 1 is a view in side elevation of a drier and cooler apparatus constructed after the manner of my invention and adapted for the accomplishment of the method to be hereinafter more fully described.
Figure 2:
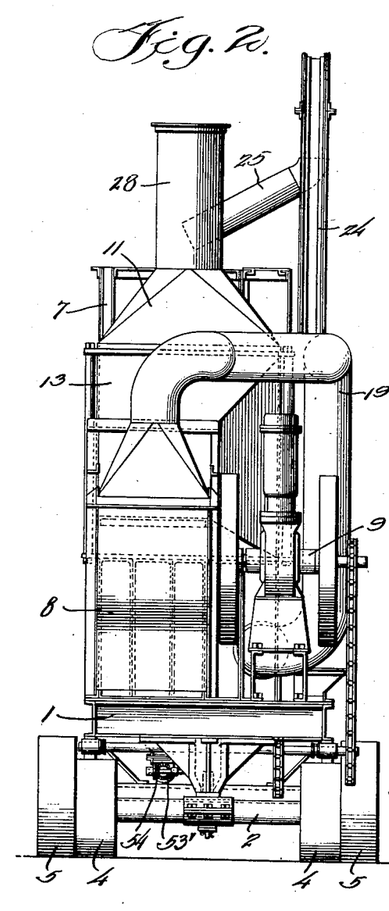
Fig. 2 is a view in end elevation of the structure disclosed in Fig. 1.
Figure 3:
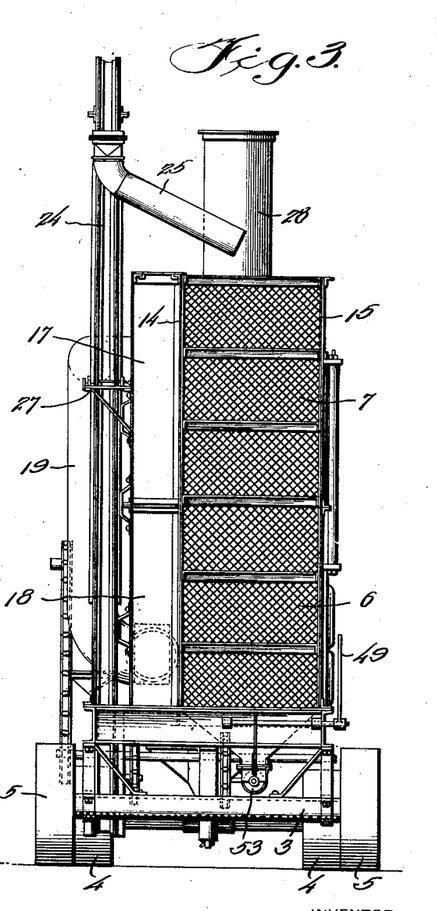
Fig. 3 is a view similar to Fig. 2 taken from the opposite end of the machine.
Figure 4:
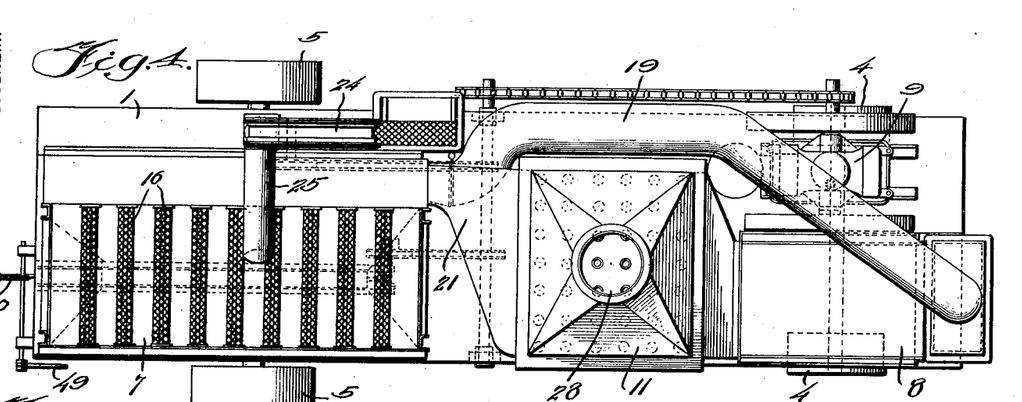
Fig. 4 is a top plan view of the structure.
Figure 5:
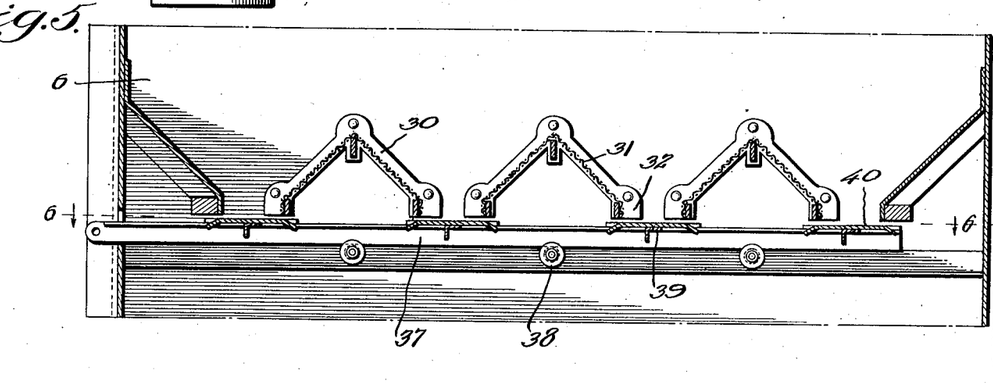
Fig. 5 is a longitudinal vertical fragmentary sectional view showing a form of grain discharge control which may be employed.
Figure 6:
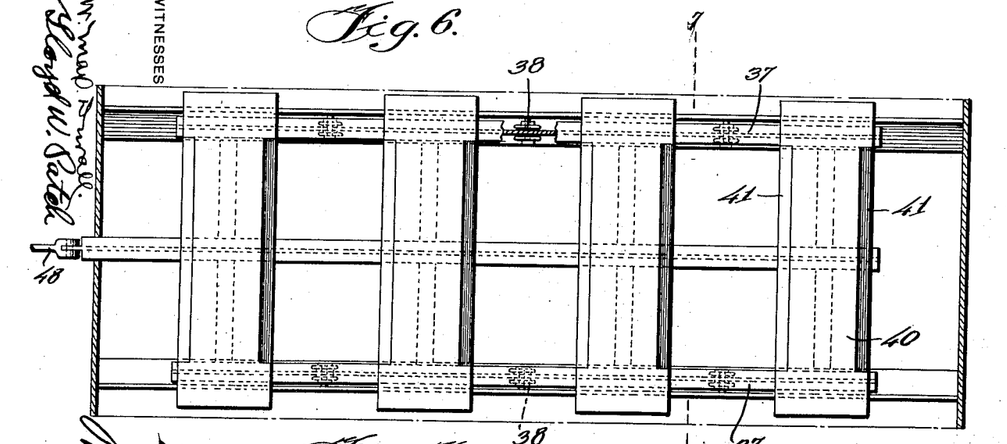
Fig. 6 is a sectional view taken on the line 6—6 of Fig. 5.
Figure 7:
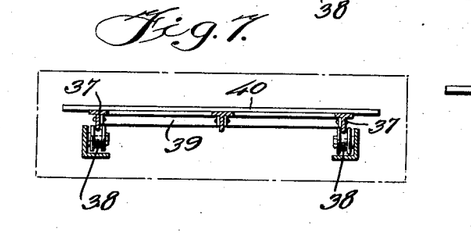
Fig. 7 is a transverse sectional view taken on the line 7—7 of Fig. 6.
Figure 8:
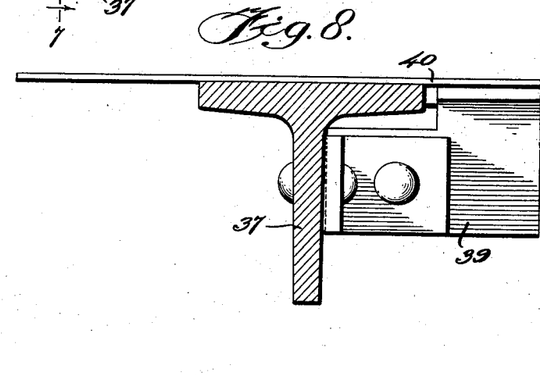
Fig. 8 is an enlarged detail sectional view showing portions of the structure as disclosed in Fig. 7.
Figures 9, 10, 11, 12, 13:
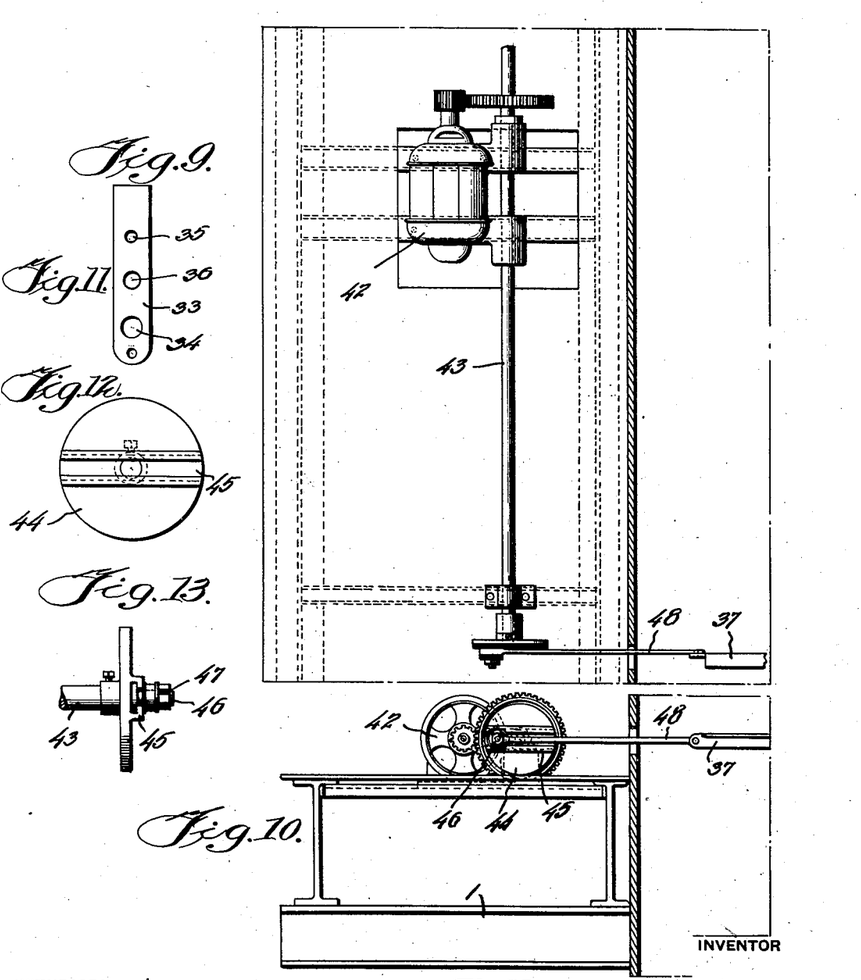
Fig. 9 is an enlarged detail view showing means for operating the control mechanism as shown in Fig. 5.
Fig. 10 is a view in end elevation of the structure shown in Fig. 9.
Fig. 11 is a detail view showing a modified form of grain discharge control means.
Fig. 12 is a detail view to show the adjustment of the discharge as illustrated in Fig. 5.
Fig. 13 is an edge elevational view of the structure as disclosed in Fig. 12.

With the structure as has been described, the parts are so arranged that the drying and cooling of the grain as supplied by the elevator structure can be efficiently and economically accomplished and the grain supplied to the drier chamber 7 can be held for any length of time and subjected to any desired degree of heat while the grain as contained in the cooler chamber 6 will be brought back to substantially atmospheric temperature, however, it is desirable in an apparatus of this type that some means be provided to give a constant outlet to the grain after the same has been subjected to the blast of cooling air in the cooling chamber and perhaps even that an automatic control be provided for the outlet of the grain. With the above in mind, I provide the hoppers 30 which form the bottom of the cooling chamber 6 and which are made up of the perforate substantially diagonally disposed walls 31 arranged to have the discharge openings 32 between the lower adjacent ends thereof. By forming the hoppers 30 in the manner as set forth, the grain in the cooling chamber will be conducted to the discharge openings 32 and these openings are placed somewhat apart, the atmospheric air may circulate freely around the same and has access to the grain as the same is conducted down over the sloping walls 31 of the hoppers. It is preferable that some means be provided by which the rate of flow of the grain through the discharge openings at 32 can be regulated and may at times even be entirely cut off and one means which might be employed is that shown in Fig. 11, namely a slide 33 having the large opening 34, the small opening 35 and an intermediate opening 36 formed therethrough, with one end left imperforate and the remaining end provided with a handle or shaped to otherwise present an end which may be readily grasped in moving the slide. When such slide as this is employed, the rate of flow of the grain through the passages 32 may be governed by simply adjusting the slide to dispose the various sized openings beneath the passages. Under some circumstances, it may be desirable to hold the grain within the cooling chamber and at such times the slide 33 will be adjusted to bring the imperforate portion thereof over the passages 32 and consequently the same will be closed to the flow of grain.

By disposing the slide as above set forth, the described object will be attained, however, it is perhaps preferable that means be employed by which the grain will be prevented from clogging or caking in the passages 32, and with this purpose in view, the angle iron supporting members 37 are mounted on suitable groove friction rolls 38 in such relation that they may have reciprocatory movement beneath the hoppers. Cross bars 39 are connected between the angle iron members 37 and the plates 40 are also mounted across these angle iron members 38. The plates 40 are made somewhat wider than the passages 32 and at their edges are bent downwardly as indicated at 41 to thus present rounded or rolled formation. A motor 42 is mounted on a proper support provided therefor and is geared to turn shaft 43, the gearing being preferably so arranged that the shaft 43 is given a low revolution per minute. The shaft 43 has a disk or eccentric wheel 44 secured on one end thereof and this eccentric disk is provided with the trackway 45 extending transversely across its face in line with the shaft 43. A bolt 46 is mounted with the head thereof in the trackway 45 and a clamp nut 47 is provided to be tightened down to clamp the head of the bolt within the trackway so that the relative disposition of the bolt with respect to the turning center of the disk 44 can be varied. A pitman rod 48 is connected with the side bars 37 by which the plates 40 are carried and has its free end mounted on the bolt 46, and in this way as the shaft 43 is revolved, oscillatory or vibratory movement will be imparted to the frame members 37 and consequently the plates 40 will have a shaking movement back and forth beneath the outlet passages 32. It is preferable that the plates 40 be disposed to be held slightly below the open bottoms of the passages 32, and that as the frame structure 37 is reciprocated to cause like movement of the plates 40, the grain will be shoved over at the forward and rear curved edges thereof and may be discharged in measured quantities by simply varying the shutting of the bolt 46 with respect to the axial turning center of the eccentric shaft 43. It will of course be understood that this vibratory discharge control means is not to be employed when the slide 33 is used and therefore the slide shifting handle 49 will be disconnected from the structure and the links 50 would be likewise dispensed with, this mechanism as just described being substituted for the slide and the shifting means thereof.

The grain after having been cooled sufficiently in the cooling chamber 6 will be discharged in a more or less constant stream through the openings of the slide 33 or over the edges of the plates 40 and a conveyer trough or tube 51 is mounted to catch the falling grain. This conveyer tube 51 has a screw conveyer 52 mounted therein and as the screw is turned, the grain will be discharged through the end 53 of this trough. The shaft of the screw conveyer 52 has a beveled gear 53' carried on the inner end thereof and meshing with a gear 54 connected on a shaft suspended beneath the frame-work 1 of the machine and arranged to have driving movement imparted thereto through the operation of the engine 9.

In carrying out the method of drying and cooling the grain in accordance with the apparatus as herein set forth, the grain will be furnished to the elevator to be discharged into the drying chamber through the supply tube 25 and after a fire has been started in the furnace to heat the chamber 13, the engine 9 is started to actuate the fan 29 and atmospheric air is taken in through the eye 22 of the fan and is passed through the chute 12 to the heating chamber 13 from which it is conducted through the tube 21 to the air distributing chamber 17. It is preferable that the damper 20 be closed during the initiation of the treatment of the grain and consequently all of the air as taken in by the fan will be caused to flow through the heating chamber 13 of the furnace and then in the heated state it will be passed through the tube 21 to the air distributing chamber 17 and if desired the draft or damper 23 may be opened to allow the heated air to flow down into the air distributing chamber 18. This heated air will find its way through the openings in the wall 14 and into certain of the pervious air ducts 16 and will then flow through the loose grain and escape from the chambers in which the grain is contained through those pervious air ducts which open through the wall 15 and to the atmosphere. This passage of heated air through the air is continued until the proper percentage of moisture has been evaporated or dried out of the grain and then the damper 20 is open to allow the passage of air at atmospheric temperature through the pipe or tube 19 to the air distributing chamber 18, it being preferable that the damper 23 be first closed. This air at atmospheric temperature as supplied to the tube 19 will find its way through the grain in the cooling chamber 6 and will exhaust it to the atmosphere and it is preferable that the flow of air through the grain in the cooling chamber be continued until the heat in the grain has been drawn off to bring the same to substantially atmospheric temperature or at least to take the heat from the grain sufficiently so that it will not sweat when stored. If the slides 33 are in use, the handle 49 will be swung to bring the proper openings of the slides beneath the outlet passages 32 of the hoppers 30 forming the bottom of the cooling chamber and the grain will then flow in a substantially continued stream down into the conveyer casing or tube 51 from which it will be discharged through the end 53 by the actuation of the conveyer screw 52. If the reciprocating discharge control is being employed, the motor 42 will be stopped previous to the supply of grain to the grain chambers and thus the discharge passages 32 will be closed against the discharge of the grain, and when the grain has been sufficiently dried and then properly cooled, the motor will be started to cause turning of the shaft 43 and the plates 40 will be given reciprocatory or vibratory movement beneath the discharge passages 32 which will cause the grain falling into these passages to be agitated or discharged and shoved over the rolled edges 41 of the plates and into the conveyer casing. The rate of flow of the discharge can be controlled by varying the setting of the bolt 46 within the trackway or groove 45 and thus the stream of grain flowing through the discharge passages may be increased or decreased to suit the condition of the grain and the particular operating condition.

With the grain flowing out at the discharge passages 32, there will be a constant settling of the grain within the drying and cooling chambers, and consequently by supplying grain through the tube 25, the operation of the device may be maintained substantially constant and untreated and wet grain will be constantly supplied to the drying chamber while the dried and properly cooled grain will discharge in a constant flow from the discharge end 53 of the conveyer.

From the foregoing it will be seen that I have provided a method of treating grain which particularly adapts itself for use at small elevators or at other points where a comparatively simple and inexpensive apparatus is desired which will treat a maximum amount of grain, and further that I have disclosed an apparatus which while perhaps particularly is adapted for use in the accomplishment of the method as above set forth, yet at the same time, accomplishes a very efficient and economical treatment of the grain and presents structure which can be operated by persons not particularly skilled in mechanics, and while in the foregoing, I have described all the certain steps for the method and have set forth only particular structure in the apparatus, it will be evident that a number of variations and changes might be resorted to in the method and in the construction of the apparatus without departing from the spirit and scope of my invention, and hence I do not wish to be limited to the exact disclosure but rather to only such points as may be set forth in the claims.

I claim:—

1. The method of treating grain which consists in passing the grain through a chamber having pervious air ducts arranged therein to be buried within the quantity of grain, passing air into said pervious ducts to circulate through the grain as the same flows around the ducts in its passage through the chamber, discharging the grain from the chamber, and agitating the grain as discharged and adjacent the discharge to maintain a free and even flow from the chamber.

2. The method of treating grain which consists in passing the grain in a constant flow through drier and cooler chambers each having pervious air ducts therein to be buried within the grain, supplying air to the pervious ducts in the drier chamber to flow through the grain and dry the same, supplying cooling air to the ducts in the cooler chamber, discharging the grain from the cooler chamber, and agitating the grain at the discharge and within the cooler chamber adjacent the discharge to thus maintain a constant and even flow at the discharge.

3. A grain treating apparatus comprising a drier chamber, a cooler chamber mounted beneath said drier chamber and provided with hoppers forming a bottom therefor with discharge passages at the bottom of the hoppers, means to supply grain to said drier chamber at the top thereof to flow through said chamber and through the cooler chamber into the hoppers, vibratory means to control the passage of the grain through said discharge hoppers to thus regulate the rate of flow of the grain, and means to discharge air into and circulate the same through the grain during its passage through said chambers.

4. A grain treating apparatus comprising a drier chamber, a cooler chamber mounted below the drier chamber and having hoppers formed in a bottom therefor provided with discharge passages at their lower ends, means to supply grain to said drier chamber at the top thereof in a manner that the grain will flow through said chamber and through the cooling chamber into the hoppers, and vibratory means to control the passage of the grain through said discharge openings to thus regulate the rate of flow of the grain through the drier and cooler chambers.

5. In combination with a grain treating apparatus having a grain receiving floor comprising a plurality of hoppers each provided with a discharge opening, plates mounted below each of the discharge openings, means connecting said plates to be moved simultaneously, and eccentric means to impart vibratory movement to said plates to thus cause agitation of the grain adjacent to the discharge openings and permit flow of the same therethrough.

6. In combination with a grain treating apparatus having a grain receiving floor comprising a plurality of hoppers each provided with a discharge opening, plates mounted below each of the discharge openings, means connecting said plates to be moved simultaneously, eccentric means to impart vibratory movement to said plates to thus cause agitation of the grain adjacent to the discharge openings and permit flow of the same therethrough, and means to regulate the throw of the eccentric means to thus vary the degree of movement of said plates.

7. In combination with a grain treating apparatus having a grain receiving floor comprising a plurality of hoppers each provided with a discharge opening, plates mounted below each of said discharge openings, means connecting said plates to be moved simultaneously, eccentric means to impart vibratory movement to said plates to thus cause agitation of the grain adjacent to the discharge openings and permit flow of the same therethrough, and a conveyer located beneath said discharge openings to receive the grain as the same falls therefrom.

8. In combination with a grain treating apparatus, having a receiving floor consisting of a plurality of hoppers each provided with a discharge opening, plates mounted beneath said discharge openings and provided with rounded edges, means by which the several plates are connected together and are mounted to be capable of reciprocatory movement in a horizontal plane, eccentric means coupled with the means by which the plates are connected together to cause vibratory movement to be imparted to said plates, means to regulate the throw of the eccentric to thus vary the degree of movement of said plates, and a conveyer mounted beneath the discharge openings to receive the grain as discharged over the rounded edges of the plates.

9. A grain drier and cooling apparatus comprising in combination a drier chamber, a cooler chamber to which said drier chamber delivers the material acted upon, means to take the material from the cooler chamber to thus cause a substantially constant flow of material through the drier and cooler chamber, a fan, a way for the egress of air from the fan to the cooler chamber, a valve in said way, a second way, a heating chamber into which said second way discharges, and a passage from said heating chamber to the drier chamber.

10. A grain drier and cooler apparatus comprising in combination, a drier chamber, a cooler chamber, to which said drier chamber delivers the material acted upon, air distributing chambers formed in conjunction with said drier and cooler chambers to thus more evenly distribute air to be circulated therethrough, means to supply air to each of said distributing chambers, means to heat the air supplied to the drier chambers, and a damper between said distributing chambers arranged to be opened to allow intermingling of the heated air and the air at atmospheric temperature.

11. A portable grain drier and cooling apparatus comprising a supporting frame, carrying wheels upon which said frame is mounted to be capable of movement, a cooler chamber mounted adjacent one end of the frame and having a bottom therefor composed of a plurality of hoppers each provided with a discharge opening, a drier chamber mounted above the cooler chamber to discharge grain therefrom into the cooler chamber, a conveyer mounted beneath the discharge openings of the hoppers, vibratory means to control and regulate the flow of grain through said discharge openings, a fan mounted at the opposite end of said frame, a furnace mounted between said fan and said chambers, a cooling air pipe led from the fan to supply air to the cooler chamber, an air supply pipe extended from the fan to the heating chamber of the furnace, a drier air supply pipe led from the heating chamber to the drier chamber, and elevator means to supply grain to the drier chamber.

In testimony whereof I affix my signature in presence of two witnesses.

FULTON R. MORRIS.

Witnesses:
GEO. A. SCHROEDER,
ERWIN A. KROHN.